United States Patent [19]

Barber

[11] 4,046,035

[45] Sept. 6, 1977

[54] METHOD OF MACHINING THE UPPER PAD ON THE SWING BEARING OF A LARGE EXCAVATOR

[75] Inventor: Ellery H. Barber, South Milwaukee, Wis.

[73] Assignee: Bucyrus-Erie Company, South Milwaukee, Wis.

[21] Appl. No.: 683,886

[22] Filed: May 6, 1976

[51] Int. Cl.² .................. B23B 1/00; B23C 3/02
[52] U.S. Cl. .................... 82/1 C; 82/2 A; 82/4 R; 90/11 C; 90/12 R; 90/15 A
[58] Field of Search .............. 90/11 C, 12 R, 15 A; 29/558; 82/1 C, 2 A, 2 D, 4 R, 4 C

[56] References Cited

U.S. PATENT DOCUMENTS

| | | | |
|---|---|---|---|
| 1,857,457 | 5/1932 | Kimmel | 82/4 R |
| 3,145,662 | 8/1964 | Rust et al. | 90/12 |
| 3,603,204 | 9/1971 | Anderson, Jr. et al. | 90/12 |

Primary Examiner—Othell M. Simpson
Assistant Examiner—Z. R. Bilinsky
Attorney, Agent, or Firm—Quarles & Brady

[57] ABSTRACT

A method is disclosed in which the excavator base is assembled, the swing gear is fastened in place on the base and the swing bearing is assembled on a lower bearing pad which extends in a circle around the swing gear. The revolving frame is assembled over the base and raised on jacks and leveled. Temporary rollers are placed on a reference surface formed on the top of the swing gear and the revolving frame is lowered onto them. A section of the swing bearing assembly is removed and a metal cutting machine having an upward directed cutting tool is mounted in its place. The revolving frame is swung on the temporary rollers and the cutting tool machines the upper bearing pad disposed on the bottom side of the revolving frame. The metal cutting machine and temporary rollers are then removed, the swing bearing section is replaced and the revolving frame is lowered back into place where it rests on the swing bearing assembly.

6 Claims, 5 Drawing Figures

METHOD OF MACHINING THE UPPER PAD ON THE SWING BEARING OF A LARGE EXCAVATOR

BACKGROUND OF THE INVENTION

The field of the invention is large excavators of the type which are shipped in sections and assembled on the job site, and particularly, to the fabrication and assembly of the swing gear and swing bearing assembly on such machines.

The base, or tub, on large excavators supports a revolving frame upon which the operator's cab, machinery and boom are mounted. The weight of the revolving frame is supported by a swing bearing assembly which is comprised of a series of ball or roller bearings disposed on the base in a circle about a central pintle. The revolving frame is swung on the swing bearing assembly by a swing drive unit which engages a circular swing gear that mounts to the base radially inward from the swing bearing.

To provide a smooth swinging motion and to evenly distribute the load among the swing bearings, the swing bearing assembly is disposed between upper and lower bearing pads which are attached respectively to the revolving frame and base and which are machined flat to provide uniform spacing therebetween. A variation in spacing of 0.001 inches over a distance of one foot can result in a doubling of the load on certain bearings and a sliding or skipping action in others. Such uneven loading results in increased wear and the sliding or skipping causes a rough swing motion.

Although the bearing pads on the revolving frame are machined flat in the plant, the large size of the base and revolving frame (35 to 100 feet) requires that they be shipped to the job site in sections where they are reassembled. Distortion of the machined surfaces on the bearing pads typically occurs from this reassembly process, primarily as a result of the heat generated during welding operations. As a consequence, it has been common practice for a number of years to machine the lower bearing pad surface after the base has been reassembled at the job site, but no satisfactory method of remachining the upper bearing pad surface has been found.

SUMMARY OF THE INVENTION

The present invention relates to a method of machining the upper bearing pad on the swing bearing assembly of a large excavator in which the revolving frame is supported and rotated on temporary rollers that rest on a reference surface and a metal cutting machine is mounted to the base beneath the upper bearing pad to machine the same as the revolving frame is rotated.

After the base and swing gear are assembled on the job site, the lower bearing pad is machined flat with respect to a reference surface which is formed on top of the circular swing gear. This is accomplished by a metal cutting machine which rides on the reference surface and swings about the center pintle. The swing bearing assembly is then placed in position and the revolving frame is assembled thereon. The revolving frame is then lifted on jacks and a section of the swing bearing assembly is removed and a metal cutting machine inserted in its place. The revolving frame is then lowered onto temporary rollers which ride on the reference surface and allow the revolving frame to be rotated in a level plane. The upper bearing pad is machined by the metal cutting machine as the surface passes thereabove during rotation of the revolving frame. When machining is completed, the metal cutting machine and temporary rollers are removed, the section of the swing bearing assembly replaced, and the revolving frame lowered back to its operating position in which its weight is born by the swing bearing assembly.

A general object of the invention is to provide uniform spacing between the upper and lower bearing pads. The lower bearing pad is machined parallel to the reference surface as is the upper bearing pad. As a result, both bearing pads are in parallel planes which are perpendicular to the axis of rotation of the revolving frame.

Another object of the invention is to allow assembly of the swing gear and swing bearing assembly before the rotating frame is assembled thereabove. Only a section of the swing bearing assembly sufficient to mount the metal cutting machine beneath the upper bearing pad need be removed and replaced while the revolving frame is in place.

Another object of the invention is to minimize the setup time for the machining process. No special rails for mounting a movable metal cutting machine are required since the metal cutting machine remains stationary. Instead, the revolving frame is rotated on the temporary rollers which ride on the reference surface formed on the top of the swing gear. This reference surface is easily and quickly established during the assembly of the swing gear and it is also used when machining the lower bearing pad.

Yet another object of the invention is to minimize the distortions caused by the sun. Because the revolving frame is rotated during the machining process, it is uniformly heated by the sun and distortions caused by uneven heating are kept to a minimum.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, and reference is made to the claims herein for interpreting the breadth of the invention.

DESCRIPTION OF THE PREFERRED EMBODIMENT

Figure 1:
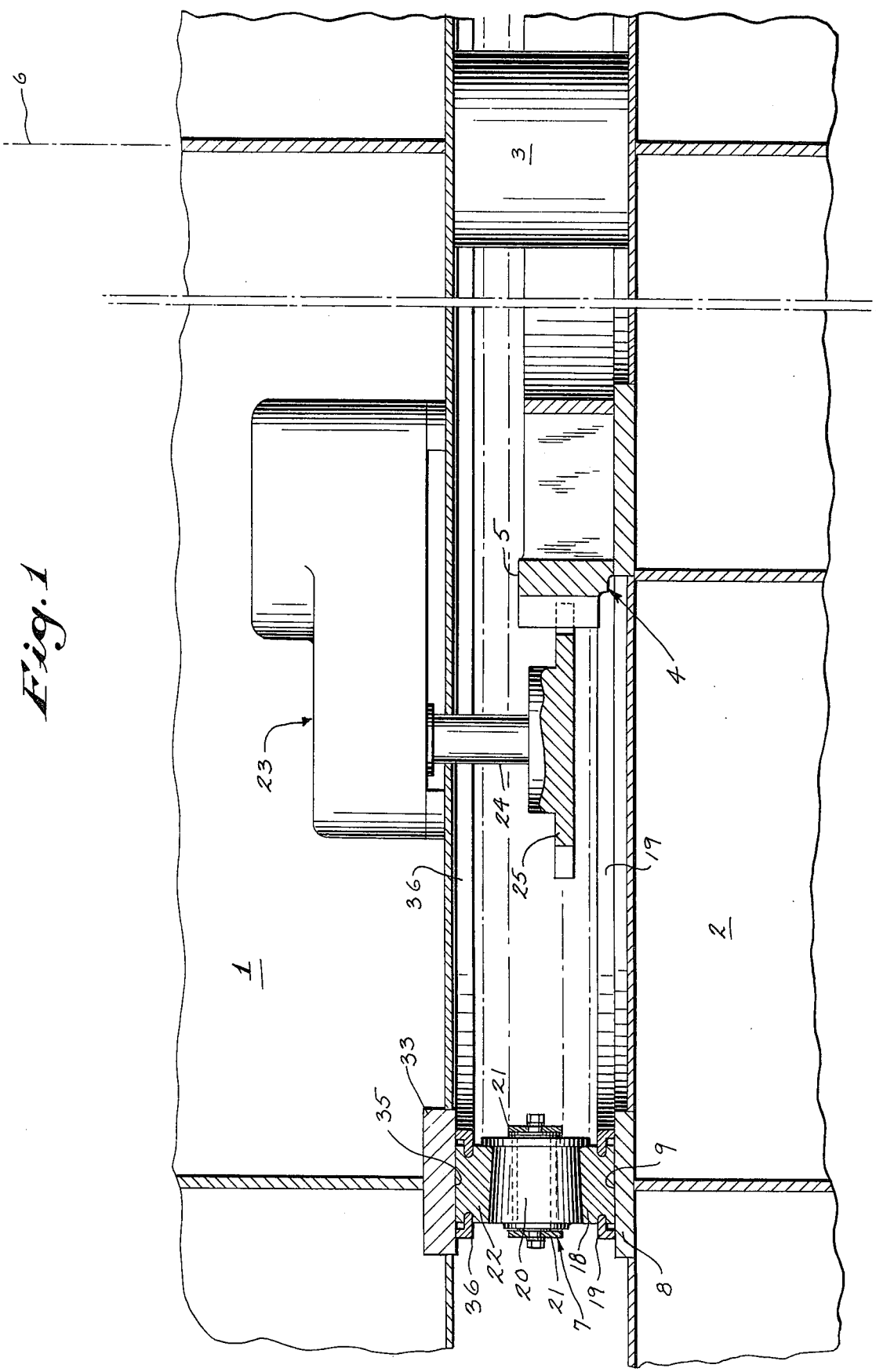
FIG. 1 is a view in cross section taken through the base and revolving frame of an excavator showing an assembled swing drive and swing bearing assembly.
Figure 3:
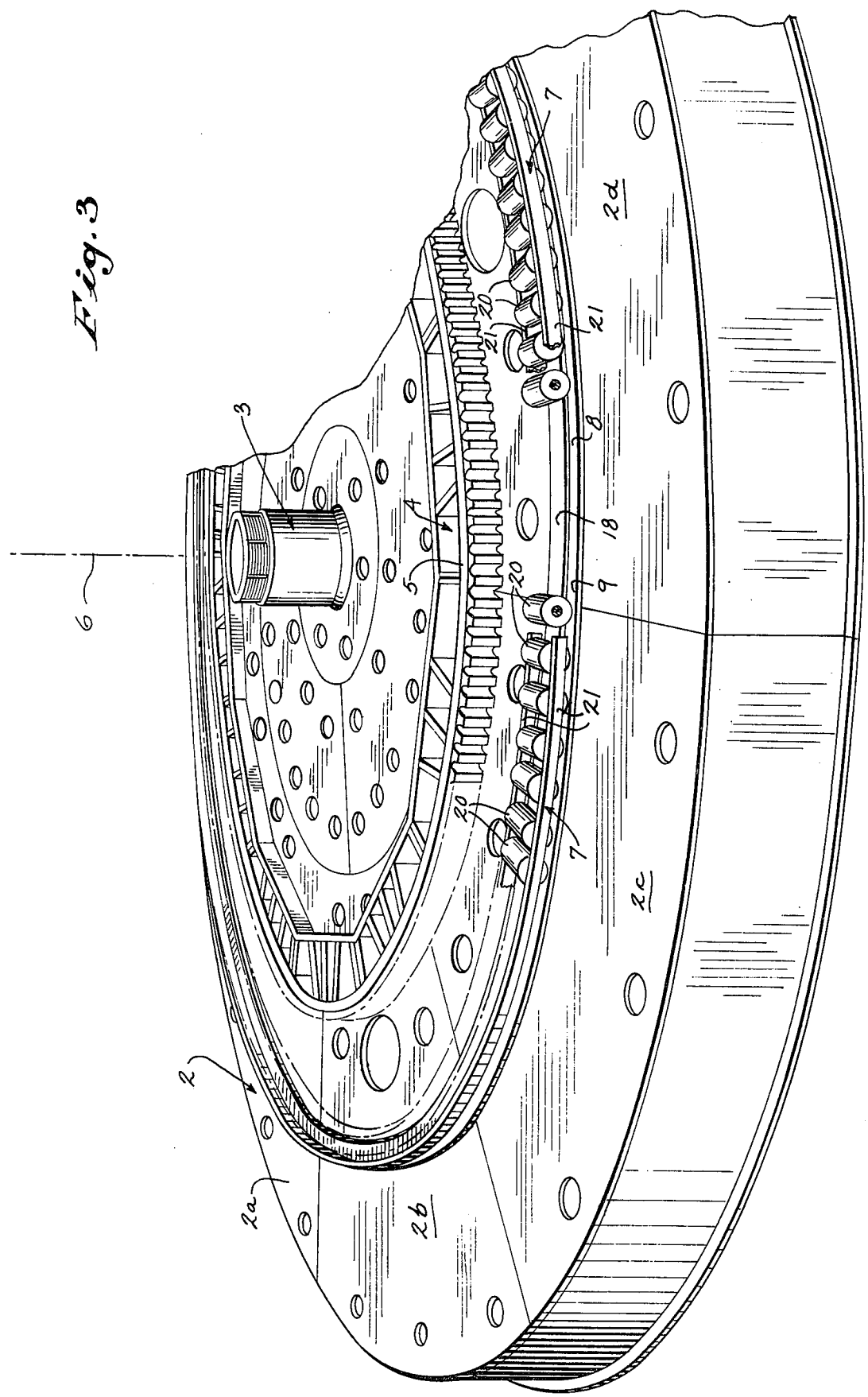
FIG. 3 is a partial perspective view of the assembled excavator base, swing gear and swing bearing assembly.

Referring to FIGS. 1 and 3, large excavators such as the walking dragline excavator model numbers 3270W and 2570W manufactured by the Bucyrus-Erie Company, assignee of the present application, include a revolving frame 1 which is rotatably supported by a circular base 2 for rotation about a center pintle 3. Due to the enormous size of these excavators, the base 2 is delivered to the job site in sections, as indicated at 2a, 2b, 2c and 2d, where they are welded together to form an integral unit. The segments of a circular swing gear 4 are then fastened to the top of the base 2 to form a circle which is concentric about the center pintle 3. An annular reference surface 5 is formed on the swing gear 4 and during its assembly, this surface is optically aligned with respect to the center pintle 3 to lie in a single plane which is perpendicular to a vertical central axis 6 that extends through the center of the pintle 3.

To provide a smooth and relatively friction free swinging motion, a swing bearing assembly 7 is to be assembled in a circle around the swing gear 4 and concentric about the central axis 6. The swing bearing assembly 7 rests on a lower bearing pad 8 which is integrally formed to the base 2 and which presents a flat annular mounting surface 9. Although the mounting surface 9 is aligned before the base sections leave the plant, distortions inevitably result from the transportation and welding together of the base sections at the job site. Consequently, before the swing bearing assembly 7 is completely assembled an on-the-site machining step is performed to align the mounting surface 9 parallel with the reference surface 5 on the swing gear 4.

Figure 2:
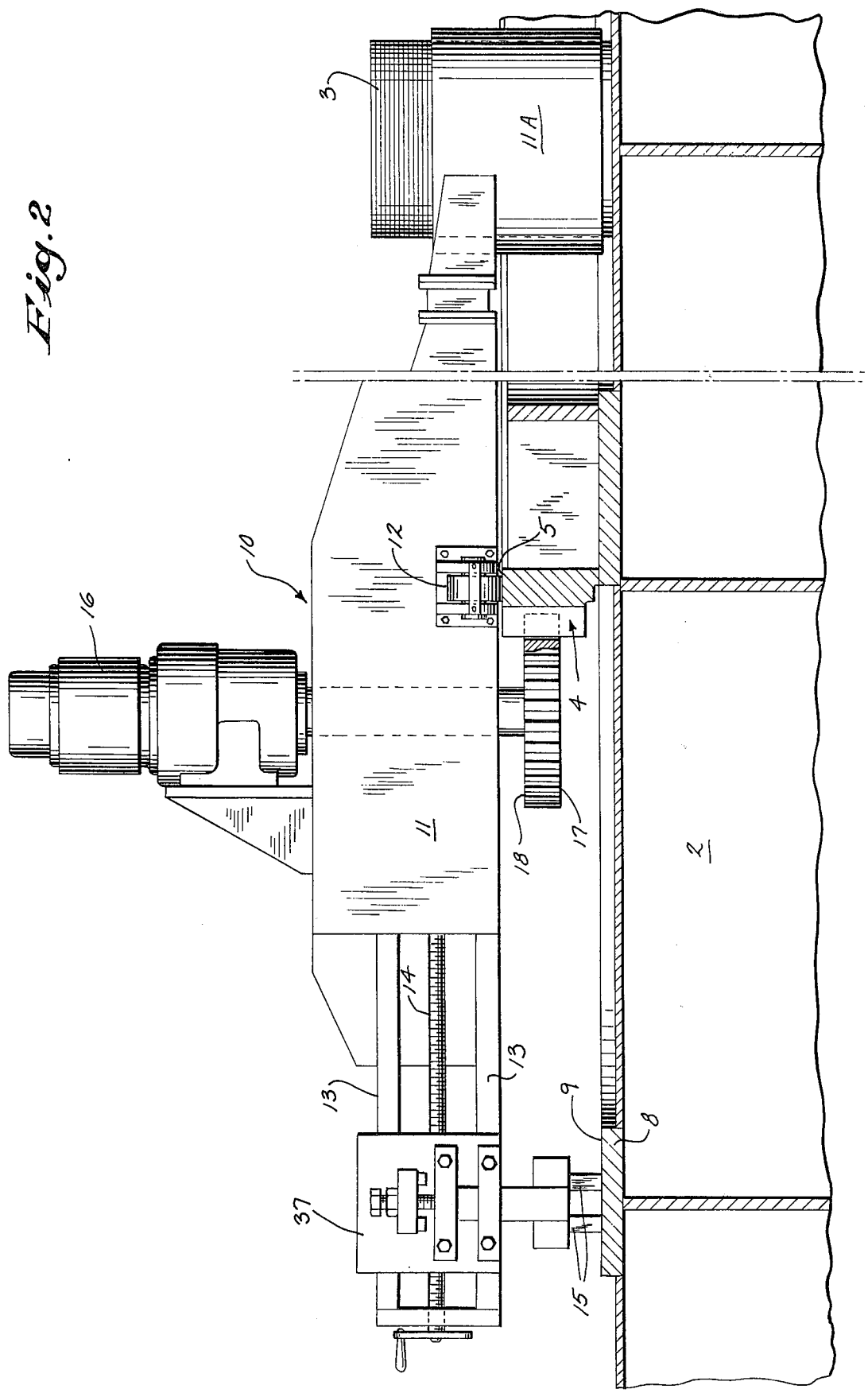
FIG. 2 is a side elevation view showing the machining of the lower bearing pad which forms part of the swing bearing assembly of FIG. 1.

Referring particularly to FIG. 2, this machining step is accomplished by temporarily fastening a swingable metal cutting machine 10 to the pintle 3. The metal cutting machine 10 includes a frame 11 which attaches to the pintle 3 by means of a sleeve 11a and which extends radially outward therefrom over a swing gear 4. A set of rollers 12 are mounted to the frame 11 and bear against the reference surface 5 to precisely maintain the vertical position of the metal cutting machine 10 during its swing about the pintle 3. The metal cutting machine 10 is swung about the pintle 3 by a drive unit which includes a motor 16 that rotates a pinion gear 17. The motor 16 is mounted on top of the frame 11 and is coupled to the pinion gear 17 by a vertical shaft 18 which extends downward to the underside of the frame 11. The pinion gear 17 engages the swing gear 4 and when rotated, the metal cutting machine 10 is swung around the pintle 3.

A cutting head 37 is supported on the outer end of the frame 11 by a pair of parallel ways 13 and is radially adjustable on the ways 13 by a lead screw 14. The cutting head 37 provides firm support for a pair of cutting tools 15 which extend downward therefrom and engage the mounting surface 9 on the lower bearing pad 8. The height of the cutting tools 15 are adjusted to remove metal during the entire swing around the pintle 3 and after two revolutions, the cutting head 37 is radially adjusted by rotating the lead screw 14. The entire mounting surface 9 on the lower bearing pad 8 is thus machined flat and parallel with respect to the reference surface 5 on the swing gear 4.

Referring again to FIGS. 1 and 3, after the lower bearing pad 8 has been machined and the metal cutting machine 10 has been removed, the swing bearing assembly 7 is constructed thereon. The swing bearing assembly 7 includes a lower rail 18 which is comprised of segments that are attached to the lower bearing pad 8 by clamps 19. The clamps 19 are received in grooves formed along opposite sides of the lower rails 18 and they are bolted to the top surface 9 of the lower bearing pad 8. A set of tapered roller bearings 20 are then placed on the lower rail 18 and roller frame members 21 are fastened to the respective ends of each roller bearing 20 to tie them together and provide uniform spacing therebetween. Finally, upper rail segments 22 are laid loosely on top of the roller bearings 20 about the entire circumference of the swing bearing assembly 7. Although it is an advantage of the invented procedure that both the swing gear 4 and swing bearing assembly 7 may be assembled before the revolving frame 1 is constructed thereabove, it should be apparent that revolving frame sections can begin to be lowered into place and fastened together as portions of the swing bearing assembly 7 are completed.

Figure 4:
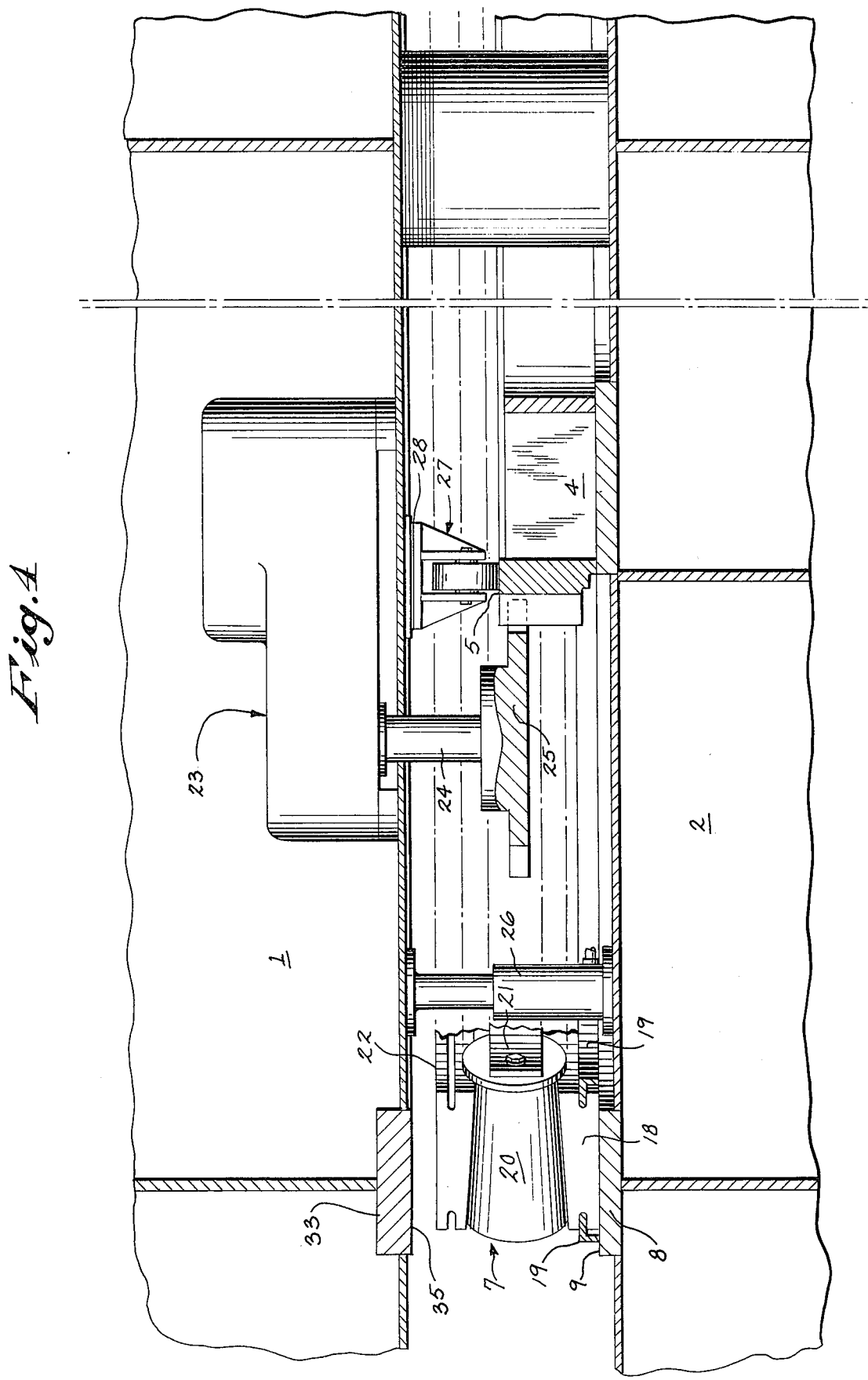
FIG. 4 is a view in cross section as in FIG. 1 showing a step in the invented procedure in which the revolving frame is in a raised position supported on jacks.
Figure 5:
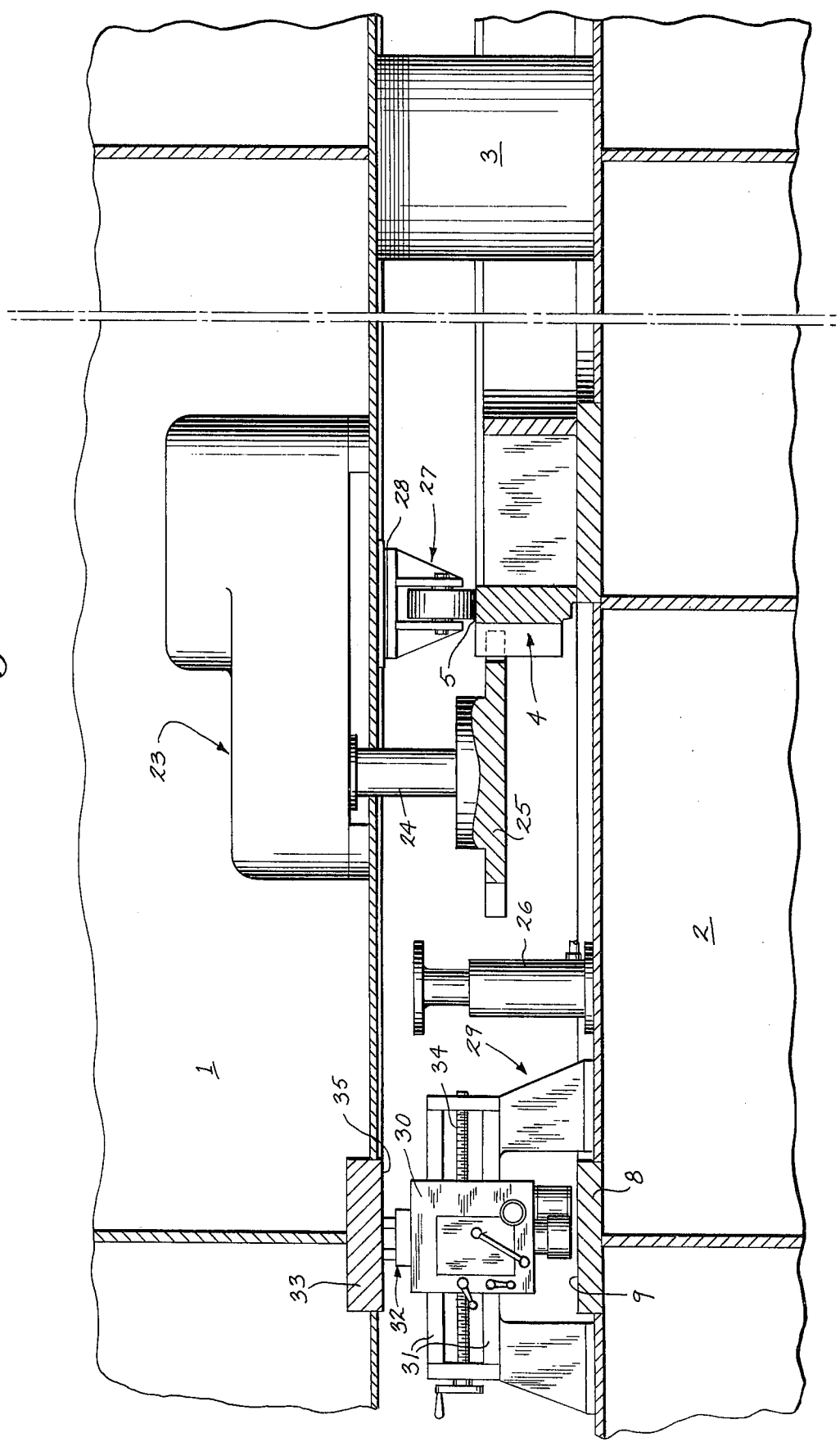
FIG. 5 is a view in cross section as in FIG. 1 showing another step in the invented procedure in which the revolving frame is supported on temporary rollers as the upper bearing pad is being machined.

Referring to FIGS. 4 and 5, the revolving frame 1 is completely assembled over the base 2 and a swing drive unit 23 is then mounted thereon. The swing drive unit 23 includes a drive shaft 24 which extends downward through an opening in the revolving frame 1 and connects to a pinion gear 25. The pinion gear 25 engages the swing gear 4, and by energizing the swing drive unit 23, the revolving frame 1 may be rotated with respect to the base 2.

The next step in the assembly procedure is to machine an upper bearing pad 33 which is integrally formed to the bottom surface of the revolving frame 1 and which is disposed directly above the lower bearing pad 8. Referring particularly to FIG. 4, the entire revolving frame 1 is lifted off the swing bearing assembly 7 by means of hydraulic jacks 26 which are disposed radially inward from the swing bearing assembly 7 and spaced equidistantly around the circumference of the base 2. The revolving frame 1 is raised sufficiently to allow the insertion of a set of temporary rollers 27 between the underside of the revolving frame 1 and the reference surface 5 on the swing gear 4. The temporary rollers 27 are disposed substantially equidistantly from one another and placed completely around the center pintle 3. The revolving frame 1 is leveled on the jacks 26 to place it in a plane perpendicular to the vertical central axis 6 and shims 28 are inserted in the gap formed between the top surface of each temporary roller 27 and the underside of the revolving frame 1. The jacks 26 are lowered to transfer the weight of the revolving frame 1 to the temporary rollers 27, which are then bolted to the revolving frame 1.

Referring particularly to FIGS. 4 and 5, either before or after the jacks 26 are lowered, a segment of the swing bearing assembly 7 is removed and a metal cutting machine 29 is mounted in the resulting space. The metal cutting machine 29 straddles the lower bearing pad 8 and is temporarily bolted to the base 2. It includes a cutting head 30 which is slidably mounted on a pair of horizontal ways 31. The cutting head 30 supports a cutting tool 32 which extends upward into contact with the bottom, or mounting, surface 35 of the upper bearing pad 33. The position of the cutting tool 32 is vertically adjustable and its radial position is controlled by a lead screw 34.

The mounting surface 35 on the upper bearing pad 33 is machined parallel to the reference surface 5 by swinging the revolving frame 1 with the swing drive unit 23. Metal is removed from the entire mounting surface 35 by adjusting the radial position of the cutting tool 32 as the revolving frame 1 is rotated on the temporary rollers 27. After this machining step is completed, the jacks 26 are again raised between the base 2 and revolving frame 1 and the revolving frame 1 is lifted off the temporary rollers 27. The temporary rollers 27 and the metal cutting machine 29 are removed and the previously removed swing bearing assembly segment 7 is reinserted and fastened in place. The jacks 26 are then lowered until the weight of the revolving frame 1 is shifted to the swing bearing assembly 7 and then they are removed. Referring again to FIG. 1, the final step in the assembly procedure is to fasten the upper rail 22 to the upper bearing pad 33. This is accomplished using clamps 36 which are bolted to the mounting surface 35 and are received in grooves formed on opposite sides of the upper rail 22.

An on-the-site procedure has thus been described for machining the upper and lower bearing pads on the swing bearing of an excavator parallel to one another. The uniform spacing between these machined bearing pads results in a smooth swing motion and a uniform distribution of weight on the roller bearings which results in reduced wear.

I claim:

1. In an excavator having a base which supports a center pintle, a circular swing gear disposed concentrically about the center pintle and a circular bearing pad disposed concentrically about the center pintle and radially outward from the swing gear, a method of machining an upper bearing pad which is mounted to the bottom of a revolving frame and disposed directly above the lower bearing pad, the steps comprising:
    lifting said revolving frame with a set of jacks;
    leveling said revolving frame;
    inserting a set of temporary rollers between the bottom of said revolving frame and the top surface of said swing gear;
    lowering said frame onto said temporary rollers;
    mounting a metal cutting machine on said base and beneath a portion of said upper bearing pad; and
    revolving said revolving frame and machining said upper bearing pad with said metal cutting machine.

2. The method as recited in claim 1 in which shims are selectively placed on said temporary rollers to maintain the level of the revolving frame when it is lowered onto said temporary rollers.

3. In an excavator having a base which supports a revolving frame for rotation about an upright pintle, having an annular swing gear mounted to the base concentric about said pintle, having an annular lower bearing pad mounted to the base and concentric about said pintle, having an annular upper bearing pad mounted to the revolving frame and positioned directly above said lower bearing pad, and having a set of bearings disposed between opposing surfaces on said upper and lower bearing pads in a circle about said pintle, a method of machining the surface of said upper pad, the steps comprising:
    raising said revolving frame to lift said upper pad upward and out of engagement with said set of bearings;
    removing a selected number of said bearings to expose a sector of said lower bearing pad;
    mounting a metal cutting machine over said exposed sector of said lower bearing pad;
    inserting temporary rollers between said swing gear and the bottom surface of said raised revolving frame;
    lowering said revolving frame onto said temporary rollers; and
    rotating said revolving frame while operating said metal cutting machine to machine the entire surface of said upper bearing pad.

4. The method as described in claim 3 in which the revolving frame is leveled with respect to the base and is lowered onto the temporary rollers in this leveled orientation.

5. A method of machining annular shaped lower and upper bearing pads on an excavator to provide uniform spacing therebetween, the steps comprising:
    assembling a base which mounts said lower bearing pad;
    establishing a reference surface on the excavator base which extends around a central swing axis of the excavator and which is perpendicular thereto;
    machining the lower bearing pad parallel to said reference surface by supporting a metal cutting machine on said reference surface and swinging it around said central swing axis;
    assembling a revolving frame which mounts said upper bearing pad directly above said machined lower bearing pad;
    supporting said revolving frame on said reference surface for rotary motion about said central swing axis;
    machining said upper bearing pad with a metal cutting machine mounted to the base beneath said upper bearing pad by rotating the revolving frame.

6. The method as recited in claim 5 in which the reference surface is formed on a swing gear which mounts to the base and which extends in a circle about said central swing axis.

* * * * *